Feb. 16, 1960 E. R. KENT ET AL 2,925,382
REMOVAL OF GRANULAR SOLIDS FROM LIQUID-SOLIDS
CONTACTING SYSTEMS
Filed Oct. 17, 1956 5 Sheets-Sheet 1

Eric R. Kent
Grady L. Payne
John J. Wise
INVENTORS

BY
ATTORNEY

Eric R. Kent
Grady L. Payne
John J. Wise
INVENTORS

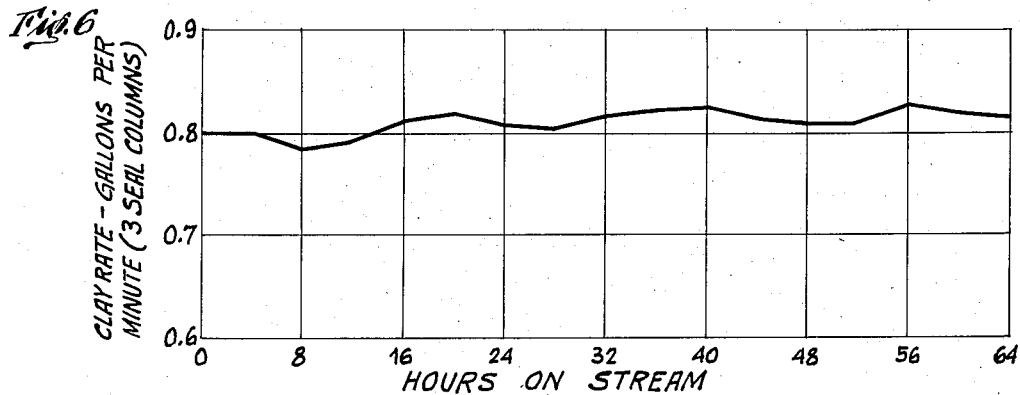
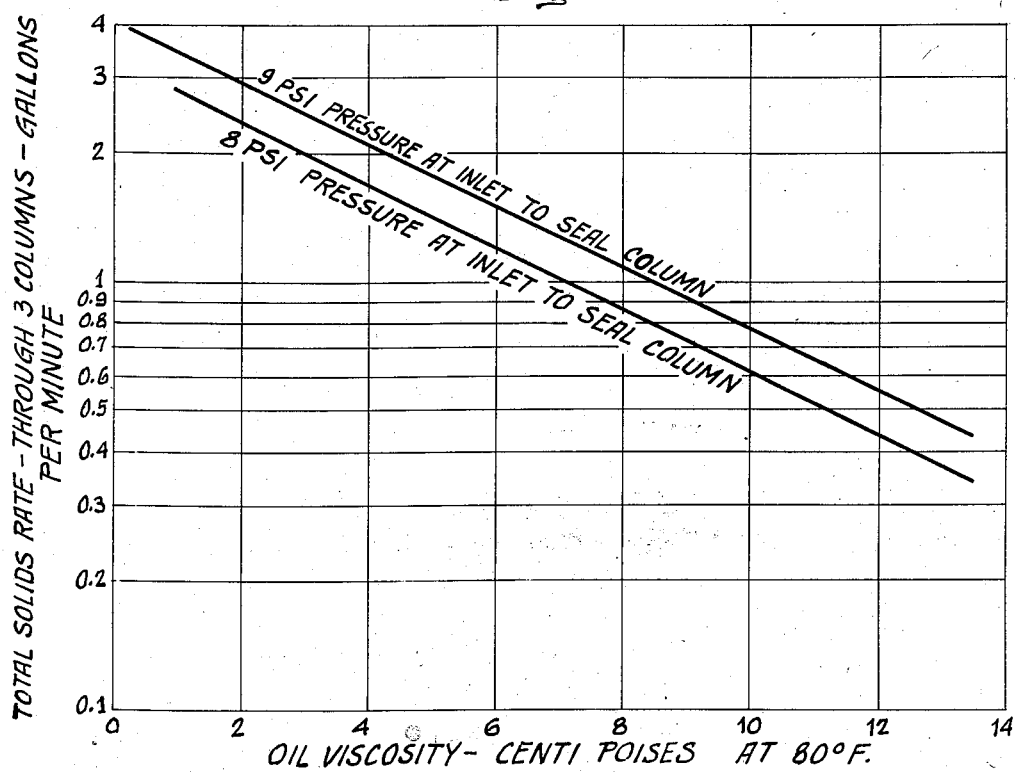

United States Patent Office 2,925,382
Patented Feb. 16, 1960

2,925,382

REMOVAL OF GRANULAR SOLIDS FROM LIQUID-SOLIDS CONTACTING SYSTEMS

Eric R. Kent, Media, Pa., Grady L. Payne, Mickleton, N.J., and John J. Wise, United States Army, assignors to Socony Mobil Oil Company, Inc., a corporation of New York Application October 17, 1956, Serial No. 616,474

7 Claims. (Cl. 208—304)

This invention deals with liquid-solids contacting and is particularly concerned with a method and apparatus for effecting control and uniform withdrawal of granular solids from the liquid-solids contacting zone. Typical of the processes to which this invention applies is the continuous countercurrent contacting of liquid hydrocarbon oils, such as mineral oils, with a moving columnar mass of granular adsorbents, such as fuller's earth, for the purpose of decolorizing the oil. Other processes to which this invention may be applied include continuous water softening by means of granular ion exchange resins and the liquid phase conversion of hydrocarbon in the presence of granular materials which are either of an inert or catalytic character.

This invention will be best understiod by referring to the attached drawings, of which:

Figure 6 is a graph illustrating the reliability of the flow combining and regulating system by plotting the flow rates obtained in a 64-hour test of the device of this invention; and Figure 7 is a graph showing the variation of flow rate with viscosity in process of this invention.

In such processes as the aforementioned, some of the most troublesome development problems have centered around the means used to withdraw the solids from the lower section of the columnar mass. It is necessary that the adsorbent move uniformly through the mass and that the adsorbent flow rate be closely and accurately controlled. In continuous lubricating oil percolation, for example, the columnar mass used is, for all commercial operations, of substantial cross-section. In removing and handling the adsorbent between the various contacting vessels it is necessary, economically, to use a commercial size pipe which is of substantially less cross-section than the contacting vessel. It was found that with a columnar mass greater than 17 square feet in cross-sectional area, more than one such conduit was necessary if uniform adsorbent movement through the columnar mass were to be achieved (see United States patent application Serial Number 237,267, filed July 17, 1951). When it became necessary to use multiple outlet pipes, however, further problems arose. Flow through the pipes must be proportional, e.g., if the pipes are of the same size, as is the usual practice, the flow rate through each must be the same.

Figure 1:
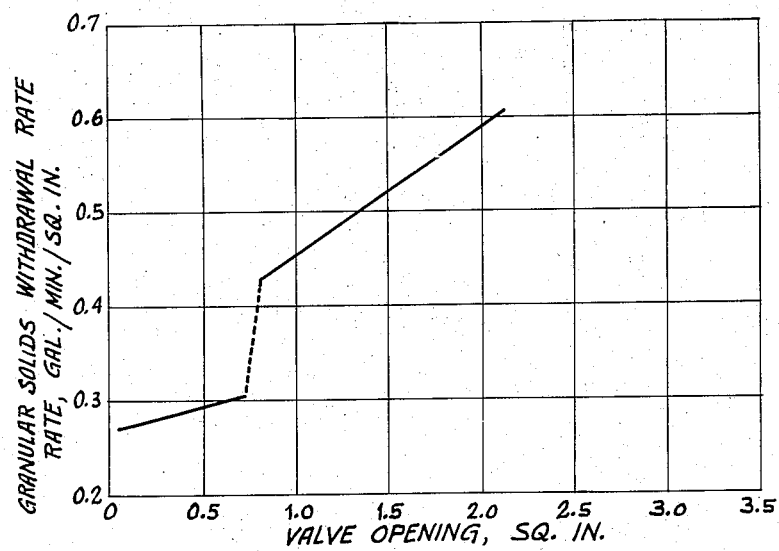
Figure 1 is a graph of the variation in the withdrawal rate of a wet granular solid stream with the opening of a valve in said stream.

Figure 1 illustrates graphically one reason why proportionate withdrawal is so difficult. The graph shows the effect of throttling by conventional variable opening throttles, e.g., valves, on the solids flow rate in a liquid-solids system of the type to which this invention applies. It will be noted that a sudden rapid increase in flow occurs at one point without any change in valve opening. It has been noted that this point coincides with a change in the type of solids flow. It is believed that at this point the flowing stream changes from one in which the solids touch each other to one in which the solids are separated from each other by liquid, i.e., fluidized flow. The former flow condition is termed herein a condition in which the solids are in the continuous phase while the latter is termed a condition with the liquid in the continuous phase.

Obviously proportionate uniform withdrawal through a plurality of pipes in the region of the break point in this curve is impossible. Moreover, proportionate withdrawal is complicated by the fact that the valve setting at which the break point occurs shifts markedly with very slight uncontrollable changes in process conditions, e.g., small variations in temperature.

One prior art system of obtaining uniform and proportionate withdrawal is to maintain the streams removed in compact flow at a velocity well below the break point of Figure 1 and to combine these streams into an annular, funnel-shaped passage which terminates in a single stream. This system is described and claimed in United States patent application Serial Number 237,267, filed July 17, 1951, and has, in the main operated very satisfactorily and is in commercial use in continuous lubricating oil percolation processes. At times, however, it was found that the compact streams, because of the close packing of the solids, did not combine in the necessary manner and some streams would flow at different rates than others, resulting in uneven flow in the columnar mass from which the streams drew solids.

An additional problem in this type of operation is reliable control of the solids withdrawal rate. From Figure 1 it is clear that valves and similar throttling means are unsatisfactory because of the change in flow type that occurs with throttling.

It is an object of this invention to provide a method and apparatus for withdrawing granular solids uniformly from a columnar mass thereof at reliable, regulated flow rates.

Another object of this invention is to provide a method and apparatus for combining a plurality of liquid-solids streams.

Another object of this invention is to provide a continuous process for the countercurrent contacting of liquid oils and granular adsorbents.

These and other objects will be apparent from the following discussion of the invention.

Broadly, the method and apparatus of this invention requires that granular solids, together with some liquid, be removed from a liquid-solids contacting zone as a plurality of confined, substantially compact seal columns. From each seal column liquid and solids flow upwardly into a separate confined withdrawal passage in communication with the seal column. The relative sizes of the seal column and withdrawal passage are maintained such that the solids are suspended as they enter the withdrawal passage in the liquid flowing upwardly into the passage. Once within the withdrawal passage the suspension is directed downwardly and all of the suspensions are combined while flowing downwardly to form a single stream. The solids withdrawal rate is then regulated by regulating the flow of the single stream.

Figure 2:
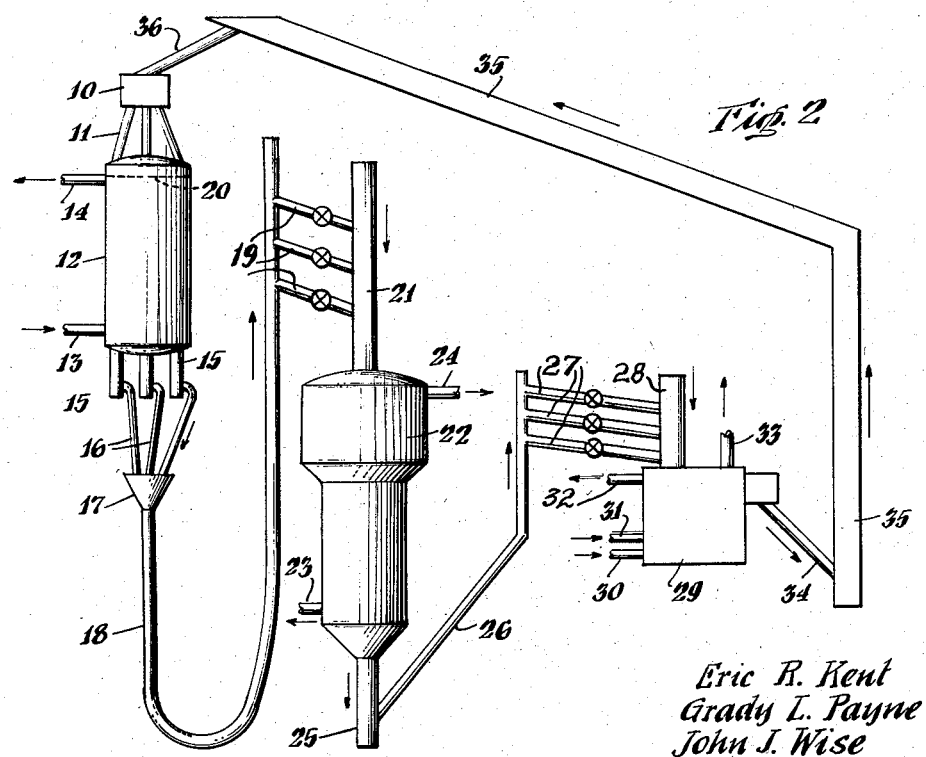
Figure 2 is an elevational view of one process and apparatus employing this invention.

Turning to Figure 2, there is shown there the application of this invention to the type of continuous lubricating percolation process commercialized as the Thermofor Continuous Percolation process. Adsorbent such as fuller's earth, bauxite, etc., is gravitated from a flow splitting device 10 through passages 11 into treater 12. The adsorbent gravitates through treater 12 as a columnar mass, that is, a mass in which particles move substantially unidirectionally downwardly as opposed to a fluidized mass where the particles move about in random motion. In the columnar mass the particles may or may not rest upon each other at all times. Liquid oil is supplied through passage 13 to the lower section of this columnar mass. This oil may be at any desired temperature but is usually heated, for example, to about 300° F. The oil flows upwardly through the mass to undergo the desired treatment which may be, for example, decolorization, filtration or fractionation. The treated oil is removed through passage 14.

Used adsorbent gravitates from treater 12 downwardly through a plurality of passages 15 as a plurality of seal columns by a mechanism which is explained in greater detail hereinbelow. The adsorbent is suspended in liquid oil within the lower section of passages 15 and passes as a fluidized stream to withdrawal passages 16. The streams flowing through passages 16 are redirected so as to flow downwardly and are then combined proportionately in a conical combining chamber 17. From the lower end of chamber 17 adsorbent and oil, still existing with the adsorbent suspended in the oil, are removed through passage 18 and flow upwardly through that passage. The suspension is removed through one of outlet passages 19. The rate of removal is controlled by selective choices among passages 19 in the manner taught in United States Patent 2,783,189 to Bergstrom et al. All of passages 19 lie beneath the liquid level 20 maintained in treater 12. The difference in hydrostatic head between the one of passages 19 used as an outlet and liquid level 20 acts to force the adsorbent through the withdrawal system. Therefore, the rate of adsorbent flow from treater 12 may be adjusted by selective choice among outlets 19. A higher outlet will give a lower flow and a lower outlet a greater flow. The solids suspended in oil pass out of passage 19 into conduit 21 and fall downwardly therethrough into the upper end of a washer 22.

Within washer 22 liquid oil which enters with the adsorbent is dissolved in a suitable solvent. The adsorbent flows through the washer normally as a compact column. The solvents which may be used include carbon tetrachloride, normal heptane, octane and the like, and petroleum naphtha. A preferred solvent is a paraffinic naphtha boiling within the range 210–300° F.

Solvent is supplied through passage 23 and the solvent-oil solution removed through passage 24. Typically, solvent will be supplied at a temperature within the range 60–250° F. Adsorbent gravitates from the lower end of the washer through conduit 25, together with a portion of the solvent from the washer. In the lower end of conduit 25 the adsorbent is suspended in the solvent and flows upwardly through a transport passage 26. Flow control is effected in the manner above described by selective choice among the outlets 27. The adsorbent with adhering solvent falls downwardly through conduit 28 into a drier 29. This drier may be of any suitable construction for removing the solvent from the adsorbent. For example, the adsorbent may exist as a fluidized bed within the drier, fluidization being effected by a gas such as a vaporized portion of the solvent naphtha or steam supplied to conduit 30. Heat may also be supplied to the bed by means of a heat transfer medium supplied through passage 31 and removed through passage 32. Fluidizing gas and vaporized solvent may be removed through conduit 33 and dried adsorbent passes from drier 29 through conduit 34 into the lower end of a conveyor 35. This conveyor may be of any desired construction such as a bucket elevator or a gas lift. Conveyor 35 discharges solids into conduit 36 from which they pass into the upper section of flow splitting device 10.

Figure 3:
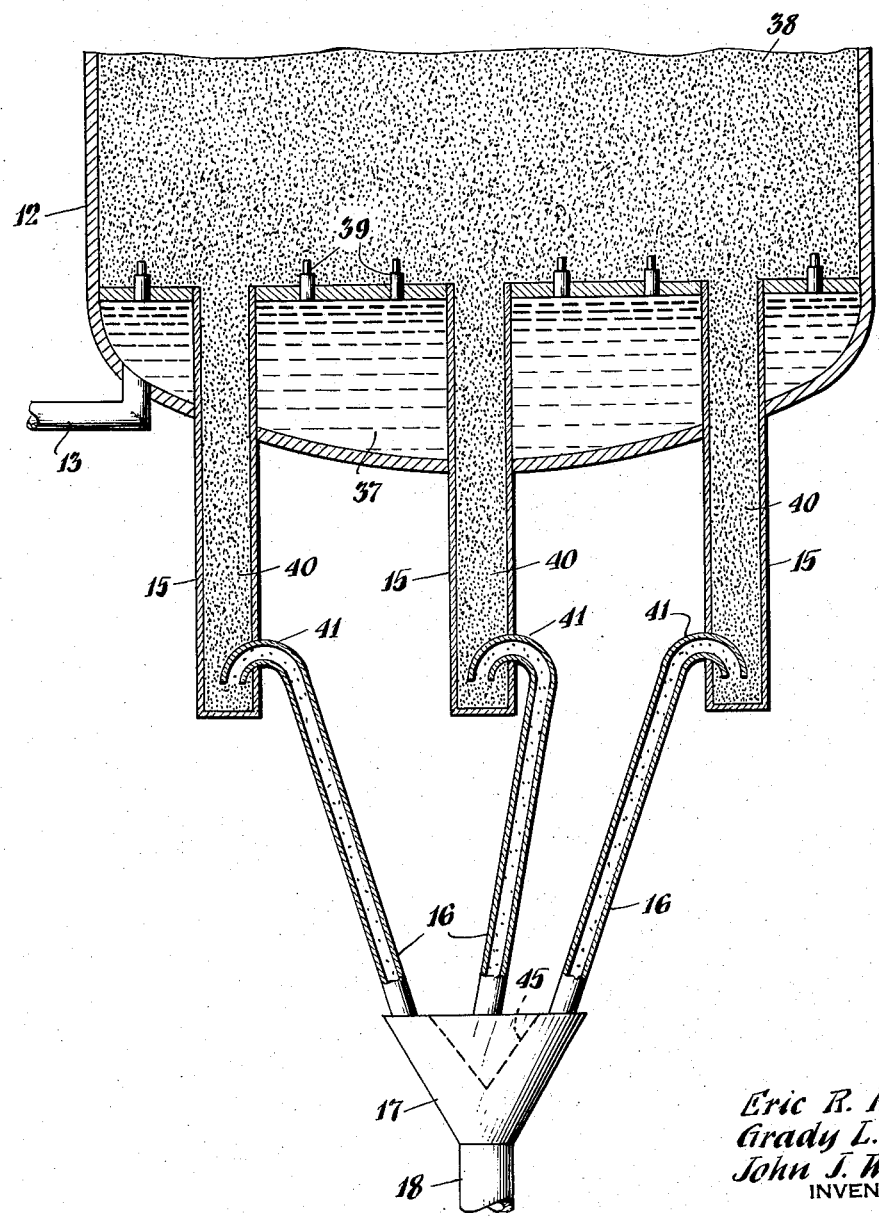
Figure 3 is an elevational view, partially in section, showing the details of one form of this invention.

The process and apparatus of this invention, by means of which uniform solids withdrawal is achieved, is illustrated in Figure 3. Within the lower section of passage 12 is maintained a plenum space 37 which is filled with the liquid charge material supplied thereto through passage 13. This liquid charge passes from plenum space 37 into the lower end of the columnar mass 38 through a plurality of spaced injection nozzles 39. These nozzles may be of a variety of constructions but preferably are of the type described and claimed in United States Patent 2,772,780 to Penick. From the lower end of columnar mass 38, adsorbent gravitates downwardly through conduits 15 as a plurality of confined, substantially compact seal columns 40. Together with the adsorbent in columns 40 a quantity of liquid oil also passes downwardly through passages 15. Conduits 16 are equipped at their upper ends with inverted U-tubes of goosenecks 41, the downwardly facing open inlet ends of which are situated within the lower section of columns 40. The liquid oil which flows downwardly through columns 40 enters the downwardly facing open inlet of goosenecks 41. As this oil enters it suspends soil adsorbent therein because of the increased oil velocity and forms a withdrawal stream. This adsorbent remains suspended as the entire withdrawal stream is redirected into a downward direction in the main portions of conduits 16. These suspensions are then combined within a combining means like funnel 17.

The process and apparatus of this invention clearly have certain advantages over the prior art. The multiple liquid-solids streams are combined while the solids are separated by liquid (liquid in continuous phase) rather than while the solids are in compacted condition (solids in continuous phase). Clearly, a more uniform combination can be obtained when the streams have the liquid in the continuous phase rather than the solids because of the greater ease with which the solids will merge in this flow condition as opposed to that where the individual solids are so close to each other that they touch.

A further advantage of this invention is that it at all times maintains seal columns 40 in compact condition. This is important since these columns act as the primary control to avoid large quantities of solids from being removed from the mass above by the flowing liquid. With prior art systems wherein it was attempted to use valves for control on the compact seal columns or on a compact stream into which the columns had been combined, or wherein a lift oil was added to the combined suspension to elevate it, very often some of the seal columns would assume the type of flow in which the liquid is in the continuous phase. These columns would, therefore, flow substantially faster than the remainder of the columns. This would cause differences in flow rate across the mass in the contacter and resultant non-uniform contacting. If a sufficient number of these columns assumed this type of flow, the greatly increased rate of withdrawal from the mass caused a substantial lowering of the mass level and even loss of the mass from the contacter completely.

This cannot happen in this invention because the liquid which removes solids from the lower end of the seal column is entirely the liquid which enters the upper end of the seal column. Therefore, regardless of the rate of flow there will be carried by the liquid to the upper end of the seal column the same quantity of solids as are removed from the lower end and it will at all times remain compact.

A further advantage of this invention is that it is self-starting. When there is a shutdown of the unit in which it is employed, adsorbent will collect in compacted condition at various points in the withdrawal system, for example, in the transport passage. When the unit is then started up, the additional pressure drop due to this compacted material will cause a very low oil flow rate which will result in little or no solids being removed from the lower ends of the seal columns. This oil, however, will act to remove the compacted material in the normally fluidized sections, and when this is removed the lower pressure drop will result in increased oil flow sufficient to remove solids from the seal columns and return the unit to normal operation.

Figure 4:
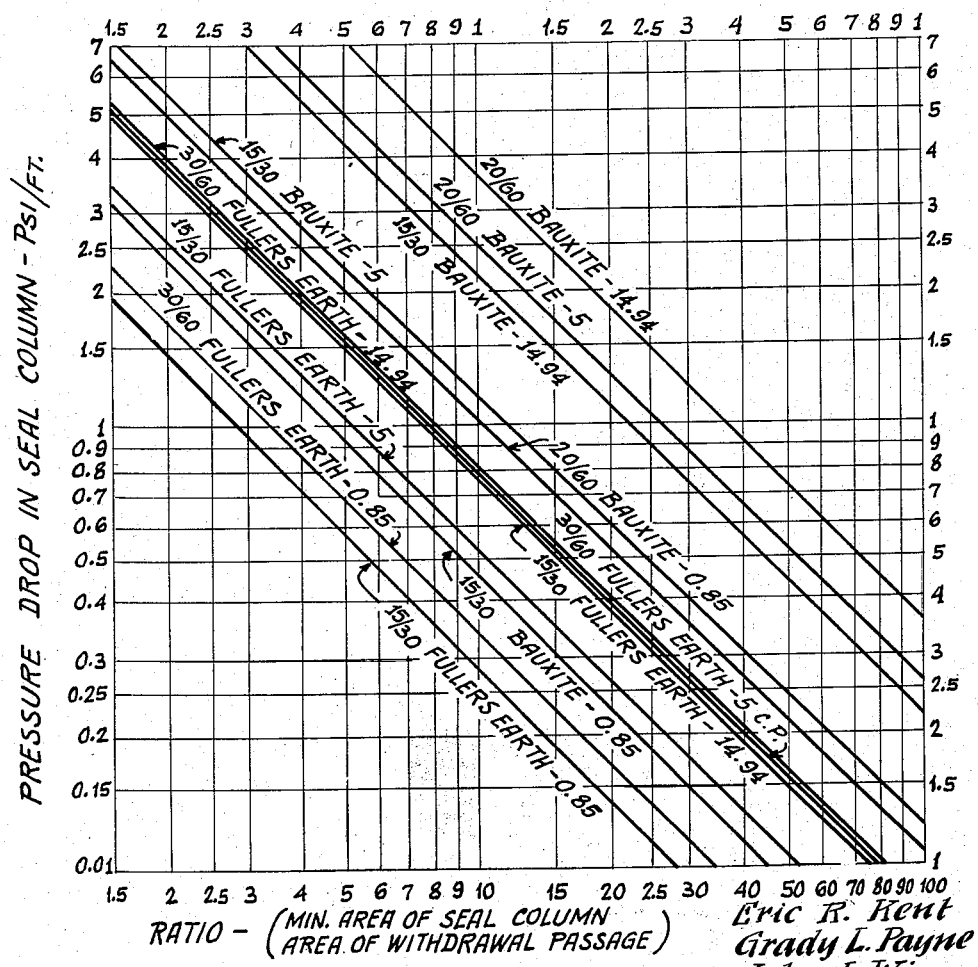
Figure 4 is a graph showing the minimum ratio of seal column area to withdrawal passage area needed for operation under this invention.

There are certain requirements necessary to the operation of a given system according to this invention. The seal column 40 must always be larger than the withdrawal passage 16 and gooseneck 41. The minimum ratio between the areas of these two will vary, depending upon the size range of solids employed, the viscosity of the liquid, density of the solids, and the pressure drop maintained across the seal column. This ratio cannot, therefore, be set forth with exactitude for each and every system in which this invention might be employed. However, there is shown in Figure 4 the minimum ratio of seal column area to withdrawal passage area at the inlet to the withdrawal passage that must be maintained with a variety of pressure drops across the seal columns, different types of adsorbents and adsorbent size ranges, and oils with different viscosities. For each of these systems to operate according to this invention the ratio of the seal column area to withdrawal passage inlet area should be above this minimum ratio. In Figure 4 each of the lines bears the name of the adsorbent to which it relates, e.g., bauxite. The numerals before the adsorbent named indicate the size range of the adsorbent to which the curve applies. For example, 20/60 indicates that the adsorbent particles were of sizes distributed between 20 and 60 mesh Tyler. The numerals after the adsorbent named, e.g., 14.94, give the viscosity of the oil in the particular system to which the curve applies in centipoises measured at 70° F. The fuller's earth used to determine some of these curves had a true density of 2.63 grams per cubic centimeter. The 15/30 mesh bauxite used had a density of 3.35 grams per cubic centimeter, while the 20/60 mesh bauxite had a true density of 3.40 grams per cubic centimeter. Data similar to Figure 4 can be routinely developed for any other system. It can be said that generally, for most systems, the ratio of seal column area to withdrawal passage inlet area should be greater than 10 and preferably greater than 25.

It is also a requirement of this invention that the suspensions flowing in the withdrawal passages be combined while flowing downwardly and not upwardly. Tests have shown that upwardly flowing suspensions do not combine uniformly and proportionately.

As explained in United States patent application Serial Number 237,267, filed July 17, 1951, the seal columns 40 should be spaced across the lower end of columnar mass 38 so as to effect proportionate withdrawal therefrom. In order that all of the solids in mass 38 will be readily accessible to a seal column and dead spaces in the mass will be avoided, each seal column should serve less than 17 square feet and preferably less than 12 square feet of columnar mass 38. These seal columns are restricted area compared to the mass and in general their total cross-sectional area should be less than 10 percent of the total horizontal cross-sectional area of mass 38. Seal columns 40 and pipes 15 which contain them are preferably of equal cross-sectional area and, therefore, uniformly distributed with respect to area across the lower end of mass 38. However, it is within the broader scope of this invention that they be of differing areas with a spacing appropriate to such areas.

In general, a conical collector of the type illustrated (member 17) is preferred for combining the streams in withdrawal passages 16. However, within the broader scope of this invention other devices may be used to combine the flowing withdrawal streams, provided they are combined while flowing downwardly. For example, a pipe of increasing size could be used with withdrawal streams entering at different vertical points. With collector 17 it is preferred that there be maintained a conical roof 45 therein so that the combining occurs in an annular downwardly tapered stream. When using collector 17 it is preferable that pipes 16 enter its upper end in a ring-shaped pattern. Details of a satisfactory collector of this type will be found in United States patent application Serial Number 237,267, filed July 17, 1951.

The flow control device of United States patent application Serial Number 424,956, filed April 22, 1954, involving an upwardly directed transport passage with multiple outlets, illustrated in Figure 2, need not be used to effect control of the solids withdrawal rate within the broader scope of this invention. However, this scheme is preferable. It is possible to even employ a variable opening device, such as a valve in passage 18, to effect flow control, provided the solids are sufficiently separated by liquid that they will not, upon throttling, revert to the flow condition wherein the solids are in the continuous phase and thus cause the flow control difficulties noted in connection with the discussion of Figure 1 to occur.

When the solids rate control system illustrated is employed, draw-off passages 19 should each have a flow capacity as great as and preferably greater than transport passage 18, so that they impose no flow restriction on the suspension flowing from the transport passage. Within the transport passage the velocity should be at least 0.1 of a foot per second and should not exceed 8 feet per second, and preferably should not be greater than 4 feet per second.

Figure 5:
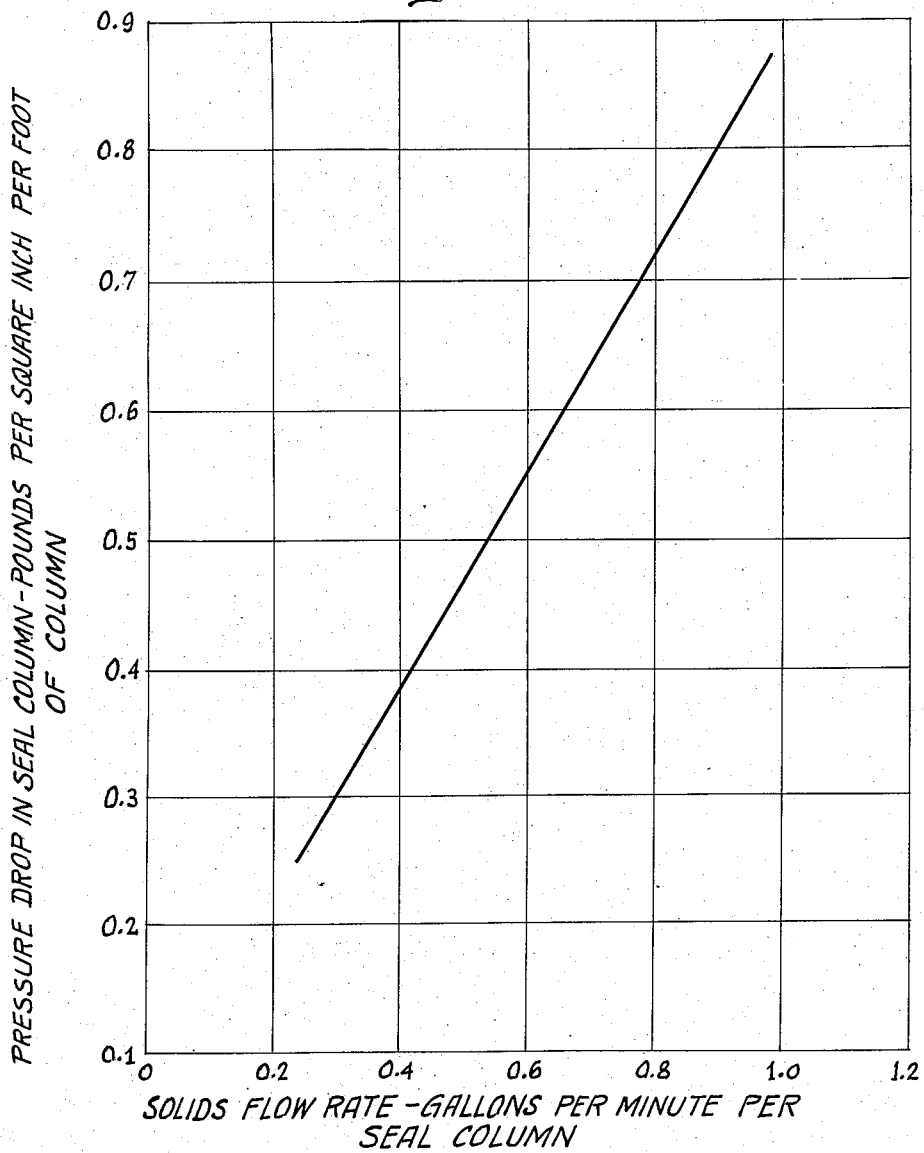
Figure 5 is a graph showing the variatiin in flow rate with pressure drop through the seal column in this invention.

The method and apparatus of this invention was tested in a pilot plant in which 3 seal leg conduits, each made of 4-inch pipe, extended downwardly from an enclosed vessel. The goosenecks and withdrawal pipes were ¾ inch pipe as was the transport passage. The data of Figure 5 show that the flow rate was completely controllable. The quantity "pressure drop in seal column" was used because it is a measure of the driving force operating to regulate the adsorbent rate.

Figure 6 demonstrates that the solids flow rate will maintain itself constant using this invention indefinitely. The slight variations in rate shown in Figure 6 are within the experimental accuracy of the determinations thereof. Figure 7 illustrates the effect of the viscosity of the oil on flow rate in this experimental unit.

All of the data in Figures 5-7 were taken on a system employing 15-30 mesh Tyler fuller's earth. An oil of 5 centipoises viscosity at 70° F. was used to obtain the data of Figures 5 and 6.

This invention should be understood to cover all changes and modifications of the examples of the invention herein chosen for purposes of disclosure which do not constitute departures from the spirit and scope of the invention.

We claim:

1. A method for the controlled withdrawal of granular solids from a confined liquid-solids contacting zone, which comprises: removing granular solids from the contacting zone as a plurality of confined, substantially compact seal columns through which liquid from the contacting zone flows; passing solids and liquid from each of said seal columns into a separate confined withdrawal passage having a downwardly facing open inlet in free communication with said seal column; maintaining each withdrawal passage sufficiently smaller than the seal column with which it communicates that the liquid enters the withdrawal passage from the seal column at a velocity sufficient to lift solids from the lower end of the seal column into the withdrawal passage and maintain the solids suspended in the liquid as it flows upwardly into the passage; maintaining the suspension of solids in liquid confined in each withdrawal passage and directing each said suspension while confined to flow in a downwardly direction; combining all of the suspensions from all of the withdrawal passages while said suspensions are flowing downwardly and forming therefrom a single combined suspension; regulating the flow of solids from said contacting zone by regulating the flow of said combined suspension.

2. A method for the controlled withdrawal of granular solids from a confined liquid-solids contacting zone, which comprises: removing granular solids from the contacting zone as a plurality of confined, substantially compact seal columns whose total cross-sectional area is less than the cross-sectional area of the contacting zone and through which liquid from the contacting zone flows; maintaining a separate confined withdrawal passage in free and open communication with the lower section of each of said seal columns through a downwardly facing open inlet; maintaining each withdrawal passage sufficiently smaller than the seal column with which it communicates that as the liquid from the seal column enters the withdrawal passage it is accelerated in velocity and lifts solids from the lower end of the seal column into the withdrawal passage and maintains the solids suspended in the liquid as it flows upwardly into said passage; after entrance of the suspension into the withdrawal passage redirecting its flow to a downwardly direction; combining all of the suspensions from all of said withdrawal passages while said suspensions are flowing downwardly and forming therefrom a single combining suspension; passing said combined suspension into and through a transport passage and adjusting the rate of flow of solids from said contacting zone by adjusting the level of discharge from said transport passage relative to the liquid level in the contacting zone.

3. The method of claim 2 further limited to: a contacting zone in which the solids exist as a columnar mass; the ratio of the area of the seal column to the area of the withdrawal passage being greater than 10; the transport passage extending upwardly and having a plurality of discharge passages connected thereto at a plurality of spaced vertical levels, all of which lie below the liquid level in the contacting zone and all of which are of sufficient size so as not impose a flow restriction on the flowing combined suspension, and controlling the rate of solids removal from the solids contacting zone by selectively withdrawing the combined suspension through the one of said discharge passages suitable to give the desired flow while permitting no withdrawal through the other discharge passages, an increase in flow being accomplished by using a lower discharge passage and thereby lowering the level of withdrawal from a transport passage, while a decrease is effected by using a higher discharge passage and thereby raising the level of withdrawal from the transport passage.

4. In a process for the decolorization of liquid hydrocarbons by flowing the liquid hydrocarbons upwardly through a downwardly moving columnar mass of granular adsorbent, a method for withdrawing the adsorbent uniformly from the lower section of the columnar mass, which comprises: withdrawing a plurality of confined, substantially compact streams of adsorbent mixed with some liquid hydrocarbons from a plurality of points uniformly spaced and distributed across the lower section of a columnar mass at a common level, the total cross-sectional area of said streams being less than the cross-sectional area of said columnar mass at the level of withdrawal; maintaining an upwardly extending withdrawal passage in open communication with the lower end of each of said streams through a downwardly facing open inlet; maintaining each withdrawal passage sufficiently smaller than the stream with which it connects that the liquid which is flowing through said stream accelerates as it enters said withdrawal passage sufficient to lift the solids from the stream into the withdrawal passage and maintain the solids suspended in the liquid as it flows upwardly into the passage; directing each of said suspensions downwardly after entrance into the withdrawal passage and combining all of said suspensions uniformly and proportionately while they are flowing downwardly into a single combined suspension; flowing said combined suspension upwardly into and through a transport passage and withdrawing the combined suspension from the transport passage through one of a plurality of outlets maintained below the level of liquid in the contacting zone; regulating the rate at which adsorbent is moving from the contacting zone by selective choice among the plurality of outlets, a higher outlet being used to reduce the flow rate and a lower one to increase it.

5. In a process for the countercurrent contacting of liquid hydrocarbons and granular adsorbents wherein the liquid hydrocarbons are passed upwardly through a downwardly moving columnar mass of adsorbent maintained within a confined percolation zone, a method for withdrawing adsorbent from the lower end of the columnar mass so as to effect uniform movement of a columnar mass, which comprises: withdrawing adsorbent particles together with some of the liquid hydrocarbons from a plurality of points uniformly distributed across the lower section of said columnar mass as a plurality of confined, substantially compact streams of adsorbent particles, the total cross-setcional area of said streams being less than the total cross-sectional area of the columnar mass; maintaining a confined withdrawal passage in communication with the lower end of each of said streams by means of a downwardly facing open inlet end; maintaining the size of each withdrawal passage less than the size of the stream with which it communicates so that the liquid enter the withdrawal passage from the stream at a velocity sufficient to lift adsorbent particles from the lower end of the stream into the passage and maintain the particles suspended in the liquid as it flows upwardly into the passage; restricting the suspension within the withdrawal passage to a downwardly flowing direction and combining all of said suspension from all of said withdrawal passages into a single confined combined suspension and regulating the rate of adsorbent withdrawal from the percolation zone by regulating the rate of flow of said combined suspension.

6. The process of claim 5 in which the ratio of the cross-sectional area of each of said streams to the cross-sectional area of the withdrawal passage with which it communicates is greater than 25.

7. An apparatus for the continuous countercurrent contacting of liquids and granular solids, which comprises in combination: an enclosed contacting vessel; means for supplying granular solids to the upper section of said vessel; means for supplying liquid to the lower section of said vessel; means for removing liquid from the upper section of said vessel; a plurality of solids withdrawal conduits connecting into the lower end of said vessel and extending downwardly from a plurality of horizontally spaced points uniformly distributed over the cross-sectional area of said vessel, said conduits being equal in size and sufficient in number so that there is less than 12 square feet of vessel horizontal cross-sectional area for each withdrawal conduit; a return bend associated with each of said withdrawal conduits, the ratio of the cross-sectional area of the conduit to the cross-sectional area of the return bend being greater than 10, one downwardly facing open end of each return bend being located within said conduit and the other extending downwardly to a level therebelow; an upright symmetrical funnel member situated beneath said contacter, the ends of all of said return bends connecting into the upper end of said funnel member; members defining a transport passageway extending from the lower end of said funnel member upwardly and members defining a plurality of outlet passageways and means for selectively opening and closing said outlet passageways.

References Cited in the file of this patent

UNITED STATES PATENTS

| | | |
|---|---|---|
| 2,631,727 | Cichelli | Mar. 17, 1953 |
| 2,684,932 | Berg | July 27, 1954 |
| 2,690,955 | Daniel | Oct. 5, 1954 |
| 2,701,232 | Kollgaard | Feb. 1, 1955 |
| 2,745,888 | Mertes et al. | May 15, 1956 |
| 2,783,189 | Bergstrom et al. | Feb. 26, 1957 |

UNITED STATES PATENT OFFICE

CERTIFICATE OF CORRECTION

Patent No. 2,925,382 February 16, 1960

Eric R. Kent et al.

It is hereby certified that error appears in the printed specification of the above numbered patent requiring correction and that the said Letters Patent should read as corrected below.

Column 1, line 29, for "understiod" read -- understood --; line 41, for "variatiin" read -- variation --; column 3, line 32, for "choices" read -- choice --; column 4, line 25, for "soil" read -- solid --; column 7, line 43, for "not impose" read -- not to impose --; column 8, line 28, for "cross-setcional" read -- cross-sectional --.

Signed and sealed this 27th day of September 1960.

(SEAL)
Attest:

KARL H. AXLINE
Attesting Officer

ROBERT C. WATSON
Commissioner of Patents